Dec. 10, 1957  J. W. HOWDEN  2,816,054
QUILTED MATERIAL
Filed April 13, 1953
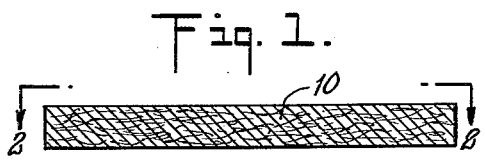
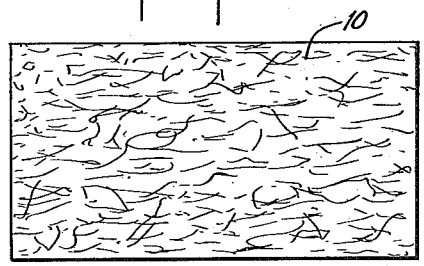
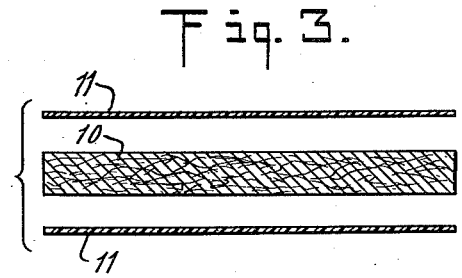
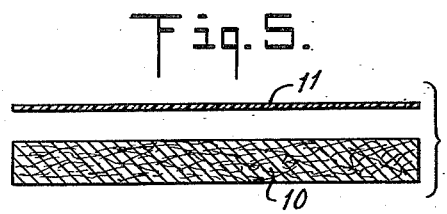
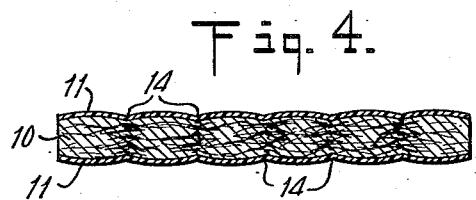
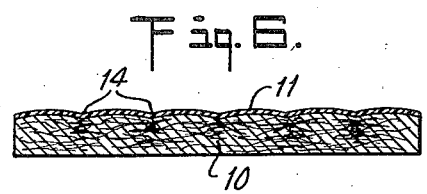
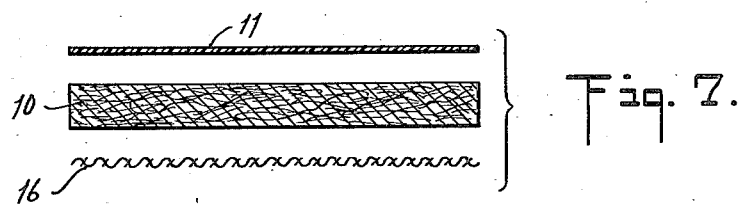
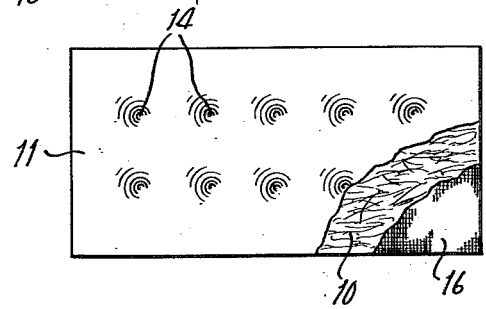
INVENTOR.
JAMES W. HOWDEN
BY
Howard J. Jeandron
ATTORNEY

United States Patent Office 2,816,054
Patented Dec. 10, 1957

2,816,054

QUILTED MATERIAL

James W. Howden, South Ramsey, N. J., assignor, by mesne assignments, to Permex Corporation, New York, N. Y., a corporation of New York Application April 13, 1953, Serial No. 348,415

8 Claims. (Cl. 154—54)

This invention relates to the manufacture of a new type fabric and more particularly to a fabric composed of laminations of material joined together to form a quilting.

In the past a quilt has been formed by stitching together two thicknesses of fabric with some soft substance such as wool between the fabrics. Whereas, this invention contemplates the combination of one or more sheets of fabric with a soft interlining without stitching. Further, this invention depends upon the use of a thermoplastic in one or more of the laminated layers so that the laminations may be sealed together at predetermined points by a hot sealing or di-electric sealing process which in effect replaces the old stitching process. In the past quilting has been formed with two thicknesses of fabric with a soft interliner and because of the type of material utilized for the interliner, it has been necessary to provide a holding stitch every 2" or less to prevent the material from shifting and compacting. This shifting or compacting of the material produces an undersirable result, namely, a rough and uneven surface. Whereas, in the present invention due to the inherent qualities of the interliner used it is not necessary to provide a stitch or seal in close proximity to the adjacent stitches or seals. A greater degree of spacing of the stitch or seal is plausible without any detrimental effect on the composite structure of the quilting.

It is an object of this invention to manufacture a form of quilting that is composed of laminations of dissimilar materials in which one or more of the layers of laminations are comprised of a thermoplastic material.

It is a further object of this invention to manufacture a form of quilting that is composed of a plurality of laminations in which the two outer sheets are a thermoplastic material and one or more laminations are an interliner in the form of a pad or bat that is permeated throughout with a thermoplastic material to bond the interlaced and adjacent fibers into a predetermined relationship, and in which the three laminations are joined together by forming a heat seal between the two outer layers.

It is a still further object of this invention to manufacture a form of quilting that is composed of a plurality of laminations in which the central lamination or interliner is a pad or bat provided with inherent tensile strength and bonding between the fibers to produce increased resiliency.

Another object of this invention is to manufacture a form of quilting that is composed of three laminations in which the central lamination is formed as a fibrous pad treated with a thermoplastic material, said pad is provided with an inherent tensile strength due to the bond between fibers which prevents the fibers from compacting, shifting, etc.

A still further object of this invention is to manufacture a form of quilting that is composed of three laminations in which the central lamination is formed as a fibrous pad treated with a thermoplastic material, said pad is provided with an inherent resiliency and bounce due to the bond between fibers.

A still further object of this invention is to manufacture a form of quilting that is composed of three laminations in which the central lamination is formed as a fibrous pad treated with a thermoplastic material, said pad is provided with an inherent resistance to moisture and to the absorption of moisture due to the moisture repellent characteristics of the thermoplastic material.

It is a further object of this invention to manufacture a form of quilting that is composed of three laminations of dissimilar materials in which one lamination is a thermoplastic material, another lamination is a textile and the third lamination is comprised of a fibrous pad or bat and in which the laminations are heat sealed together at predetermined points to retain the laminations in their respective relationship.

It is a still further object of this invention to manufacture a form of quilting that is composed of laminations of two outer sheets of a thermoplastic material and an interlining of a fibrous pad or bat that is permeated with a thermoplastic material in which the three laminations are joined together by forming a heat seal at predetermined points between the three laminations to retain the laminations in their respective relationship.

A further object of this invention is to manufacture a form of quilting that is composed of two laminations of dissimilar materials in which one lamination is composed of a thermoplastic sheet while the other lamination is a fibrous pad or bat permeated with a thermoplastic material in which the two laminations are joined together by forming a heat seal at predetermined points between the two laminations to retain the laminations in their respective relationship.

A further object of this invention is to manufacture a form of quilting that is composed of two laminations of dissimilar materials in which one lamination is composed of a thermoplastic sheet while the other lamination is a fibrous pad or bat permeated with a thermoplastic material in which the two laminations are joined together by forming a heat seal at predetermined points between the two laminations to retain the laminations in their respective relationship and in which the fibrous pad within the quilting will not change its general formation due to its inherent ability to resist compacting or shifting of the fibers within the pad.

Other objects of this invention may be apparent by reference to the accompanying detailed description and the drawings in which:

Fig. 1 illustrates in cross section a fibrous pad or bat of a thermoplastic material that is heat sealed at a plurality of points, Fig. 2 is a plan view taken on line 2—2 of Fig. 1, Fig. 3 is an exploded cross sectional view of the combination of two thermoplastic laminations with a fibrous pad or bat, Fig. 4 is a cross sectional view illustrating the combination of the laminations of Fig. 3 when they are heat sealed together over a plurality of predetermined points, Fig. 5 illustrates an exploded view of the combination of a thermoplastic sheet and a fibrous pad or bat, Fig. 6 is a cross sectional view illustrating the combination of the laminations of Fig. 5, by heat sealing over a plurality of predetermined points, Fig. 7 is an exploded view in cross section illustrating the combination of three laminations of dissimilar materials, and Fig. 8 is a plan view of the components of Fig. 7 after the heat sealing process.

Before referring to the drawings and the combinations of the laminations as illustrated in the various figures, it is important to understand the composition of the laminations and the materials that are considered as included in the various applications. The laminations referred to except where defined as a pad or bat shall be considered in the form of a sheet or film and such sheet or film includes thicknesses of 1 to 20 mills. The thermoplastic sheets referred to in this application shall include:

(1) Ethyl cellulose
(2) Cellulose acetate
(3) Nylon
(4) Polyethylene
(5) Poylvinyl butyral
(6) Vinyl chloride-acetate
(7) Vinylidene chloride
(8) Vinyl acetate
(9) Rubber chloride
(10) Rubber hydrochloride
(11) Misc. products having the same thermoplastic characteristics Of the above thermoplastics the particular ones most commonly used are the plasticized vinyl chloride, acetate copolymer and the plasticized polyvinylidene-chloride copolymer and rubber hydrochloride. Likewise the textile lamination referred to shall include the various presently used textiles such as burlap, osnaburg (canvas) cheese cloth, tobacco cloth, and equivalents. The fibrous pad or bat referred to is presently manufactured under a trade name of Permex. Essentially the pad or bat referred to throughout this application is a fibrous product. The fibrous product is not confined to a particular class of such products but rather includes any fibrous product which may normally be fixed by garnetts or carding machines. The pad or bat produced by the Permex process is either a garnetted or carded fibrous product to which a dry thermoplastic powder is added. That is, the powder is applied to the web produced by the garnett or card (this application of powder does not effect in any way the normal operation of the garnett or card) as the web comes off the garnett or card it is handled in the usual manner. For example, it is lapped in successive layers to form a thick bat or piled or compacted in another, to form a pad. The pad or bat is passed by means of a conveyor or other means through an oven. While passing through the oven the heat applied causes the thermoplastic powder to melt and flow. As the melted powder flows, capillary action of the liquid will cause it to travel for some distance along every fiber it comes in contact with. Thus it is apparent that a portion of a great many of the fibers in the pad or bat are coated with a thermoplastic liquid. After the pad or bat leaves the oven the pad or bat is simultaneously compressed and cooled. The compression of the numerous fibers of the bat causes these fibers to come in intimate contact one with another and the cooling of the thermoplastic, while the fibers are retained in this relationship, produces a jell or set of the thermoplastic into a tough elastic bond. It is apparent that these two compressing and cooling operations taken simultaneously cause the locking of innumerable fibers one to another by the bonding thermoplastic. Thus there is an anchoring of the fibers one to another throughout the web of the pad or bat. This locking or anchoring atcion utilized with a bat made of any fibrous product produces increased resiliency and tensil strength in that it does not permit the fibers to be further compacted together by a compressive force or slide or pull apart by either a compressive or tensil stress. Likewise the pad becomes more durable and will not flatten and change its shape with repeated compressive and tensil stresses. The garnetted and shredded stock that may be utilized will include primarily:

Cotton waste such as noils, strips, fly, motes, picker, opener, clips, sweeps, etc.
Linters by-product of cotton oil mills, excess fibers from cotton seed.
Waste stock thread waste or fabrics scraps or cuttings of cotton, wool, rayon or mixtures thereof.
Rayon waste from rayon producing mills, spinning, weaving, or knitting mills.
Wool waste fibers from wool spinning mills such as card waste, napper, etc.
Other fibrous products such as jute, bagging waste, cattle hair, sisal, carpet waste, etc.
Metallic yarns such as laminated aluminum foil, and
Any fibrous product which may be garnetted or carded.

The thermoplastic film when used for the two outer layers of the quilting need not be equal in thickness as one face of the finished fabric will be considered the top or wearing face while the opposite face is considered simply the backing. The so-called Permex pad, bat or web to be used may be comprised of a cotton web or any of the above classified fibers into which a thermoplastic or synthetic resin is mixed.

Referring to Fig. 1 there is illustrated the simplest form of this invention, the Permex pad or bat 10. The pad 10 may be formed as above described in the Permex process or the fibrous material utilized may be permeated with a dry thermoplastic powder and the pad may be passed through a number of hot rollers. The hot rollers will produce the same result as the oven as described in the Permex process. Thus in addition to heating the thermoplastic powder to melt it into a liquid, the fibers would be compressed and held in a compressed relationship by the rollers. Thus the treated pad may pass directly into a plurality of cold rollers to set the thermoplastic material and retain the pad in a desired degree of compression so that the pad leaving the cold rollerse will be a finished pad ready for use. This pad 10 may be passed through additional hot rollers to soften the thermoplastic bonding material and when the thermoplastic material is sufficiently soft to permit the movement of adjacent fibers, the pad may then be passed between cooling rollers. But in this instance the cold rollers have a particular configuration so that they will only compress the pad at predetermined points along the area of the pad. The points of compression will produce a bonding effect from either side of the pad. The general affect of the Permex pad 10 after this treatment is to produce a quilted formation over the entire surface of the pad.

Referring to Figs. 3 and 4 there is illustrated a similar pad 10 to that above described and an upper and lower sheet of thermoplastic material 11. In Fig. 4 there is illustrated the effect of heat sealing by hot rolling or the di-electric treatment of the laminated sheets at predetermined points 14 over the entire area of the laminations to produce an adhesion between the three laminations illustrated. This produces a quilting effect and retains the laminations in their respective relationship.

Referring to Figs. 5 and 6 there is illustrated a similar pad or bat 10 with a single top thermoplastic sheet 11. In Fig. 6 there is indicated the effect of hot rolling or heat sealing by a hot roller or the di-electric process to produce a plurality of points 14 of adhesion between the two laminations. In this embodiment of this invention the quilting effect can be produced on the top sheet 11 while producing a hard flat back surface on the bat 10. This is accomplished by the proper dispersion of the thermoplastic material that has been impregnated into the bat 10 and insuring a quantity of this thermoplastic material spread over the surface 15 of the bat that is to become the back in this instance.

Referring to Figs. 7 and 8, in Fig. 7 there is illustrated the same bat or pad 10 with a top thermoplastic sheet 11 and a bottom textile sheet 16. In Fig. 8 there is illustrated a plan view of the components of Fig. 7 after they have been joined in similar fashion to the above illustrated examples. In this instance it is important that the thermoplastic material in the bat 10 be sufficiently in evidence along the lower face of bat 10; so that during the hot sealing process, to produce a quilted effect, the various points of adhesion will cause the thermoplastic on the lower surface of bat 10 to form a strong adhesion between the textile sheet 16 and the bat 10. The modification illustrated in Figs. 7 and 8 will produce a fabric with a high wearing quality front provided by the thermoplastic sheet 11 and an extremely tough and strong back sheet 16 to resist the tensile and compressive stresses that may be produced in the distortion of the fabric in use.

Although there is disclosed a particular embodiment of this invention in which a definitely defined material has been described, this invention shall be limited only by the appended claims.

What is claimed is:

1. A quilting material which includes a plurality of layers in which the two outer layers are in the form of films of a thermoplastic material and an interliner of a fibrous pad, a plurality of predetermined points in equal spaced relation on said fibrous pad bonded to each thermoplastic layer.

2. In a device according to claim 1 in which the resulting quilting material has been compressed to a predetermined thickness.

3. In a device according to claim 1 in which the thermoplastic film is nylon.

4. A quilting material comprising a plurality of laminations in which the two outer laminations are in the form of films of a thermoplastic material and an interliner of a fibrous pad, said fibrous pad retained in a predetermined bonded form by a thermoplastic material, said composite quilting material bonded together at a predetermined plurality of equally spaced points, said bond occurring between the inner surface of said films and the touching fibers of said pad, to retain said laminations in their respective relationship.

5. In a material according to claim 4 in which said fibrous pad is comprised of thread waste, fabric scraps, cuttings of cotton, wool, rayon, mixtures of garnetted and shredded waste stock.

6. In a material according to claim 4 in which said fibrous pad is comprised of card waste which is the waste fibers from wool spinning mills.

7. In a material according to claim 4 in which said fibrous pad is comprised of jute.

8. In a material according to claim 4 in which one outer lamination is rubber hydrochloride, another outer lamination is jute, and the third lamination is a fibrous pad interliner comprised of thread waste which is waste stock.

References Cited in the file of this patent

UNITED STATES PATENTS

| | | |
|---|---|---|
| 166,262 | Corwin | Aug. 3, 1875 |
| 2,277,049 | Reed | Mar. 24, 1942 |
| 2,372,433 | Koon | Mar. 27, 1945 |
| 2,385,870 | Lashar | Oct. 2, 1945 |
| 2,438,771 | Topjian | Mar. 30, 1948 |
| 2,464,301 | Francis | Mar. 15, 1949 |
| 2,537,126 | Francis | Jan. 9, 1951 |
| 2,538,899 | Dodge et al. | Jan. 23, 1951 |
| 2,544,797 | Lippmann | Mar. 13, 1951 |
| 2,578,709 | Lyijynen | Dec. 18, 1951 |
| 2,616,482 | Barnes | Nov. 4, 1952 |
| 2,621,139 | Messing | Dec. 9, 1952 |
| 2,671,496 | Chavannes et al. | Mar. 9, 1954 |
| 2,689,199 | Pesce | Sept. 14, 1954 |

FOREIGN PATENTS

| | | |
|---|---|---|
| 668,217 | Great Britain | Mar. 12, 1952 |